(12) United States Patent
Melchiors et al.

(10) Patent No.: US 7,022,760 B2
(45) Date of Patent: Apr. 4, 2006

(54) CROSSLINKABLE BINDER DISPERSIONS

(75) Inventors: Martin Melchiors, Leichlingen (DE); Rolf Gertzmann, Leverkusen (DE); Sandra Grosskopf, Bedburg (DE); Raul Pires, Köln (DE)

(73) Assignee: Bayer Aktiengesellschaft, Leverkusen (DE)

( * ) Notice: Subject to any disclaimer, the term of this patent is extended or adjusted under 35 U.S.C. 154(b) by 202 days.

(21) Appl. No.: 10/391,169

(22) Filed: Mar. 18, 2003

(65) Prior Publication Data

US 2003/0181576 A1    Sep. 25, 2003

(30) Foreign Application Priority Data

Mar. 21, 2002   (DE) ................ 102 12 545

(51) Int. Cl.
*B32B 27/26* (2006.01)
*B32B 27/30* (2006.01)
*B32B 27/36* (2006.01)
*C08L 33/12* (2006.01)
*C08L 33/14* (2006.01)

(52) U.S. Cl. ............ 524/553; 428/480; 428/500; 428/523; 524/555; 524/556; 524/558; 524/560; 524/561; 524/562; 524/601; 524/604; 524/605

(58) Field of Classification Search ......... 428/480, 428/500, 523; 524/553, 556, 560, 561, 562
See application file for complete search history.

(56) References Cited

U.S. PATENT DOCUMENTS

| | | | |
|---|---|---|---|
| 4,954,589 A | 9/1990 | Sugawara et al. | 526/255 |
| 5,475,073 A | 12/1995 | Guo | 526/333 |
| 5,646,225 A | 7/1997 | Guo | 526/318.5 |
| 5,728,777 A | 3/1998 | Guo | 525/328.8 |
| 5,770,555 A * | 6/1998 | Weinstein | 510/434 |
| 5,959,035 A | 9/1999 | Guo | 525/123 |
| 2001/0056154 A1 | 12/2001 | Blum et al. | 524/522 |

FOREIGN PATENT DOCUMENTS

| | | |
|---|---|---|
| FR | 2 690 449 | 10/1993 |
| JP | 59012798 A * | 1/1984 |
| JP | 3-212459 | 9/1991 |
| JP | 06172451 A * | 6/1994 |
| JP | 08157537 A * | 6/1996 |
| JP | 2000136330 A * | 5/2000 |
| WO | 99/51658 | 10/1999 |
| WO | 00/00527 | 1/2000 |

OTHER PUBLICATIONS

Abstracts for Japanese Patent No. 59-12908, Yukata, Jan. 23, 1984.*
CAPLUS accession No. 2002:843978 for Chinese Patent No. 1,322,775; Mingchen Zhenbang Fluoric Paint Co., Ltd., Nov. 21, 2001.*
Chemical abstracts registry No. 111-45-5 for ethylene glycol monoallyl ether.*
Patent Abstracts of Japan, vol. 008, No. 098 (C-221), (May 05, 1984) & JP 59 12908 A (Nippon Kayaku KK; Others: 01), (Jan. 23, 1984) Zusammenfassung.
Database WPI Section Ch, Week 199510, Derwent Publications Ltd., London, GB; AN 1995-070347, XP002245116 & JP 06 345822 A (Central Glass Co Ltd), (Dec. 20, 1994) Zusammenfassung.

* cited by examiner

*Primary Examiner*—Robert Sellers
(74) *Attorney, Agent, or Firm*—Joseph C. Gil; Thomas W. Roy

(57) ABSTRACT

The invention relates to aqueous crosslinkable binder dispersions comprising hydroxy-functional copolymers based on ethylene glycol monoallyl ether, to a process for preparing them and to the use of the dispersions in coating materials.

8 Claims, No Drawings

CROSSLINKABLE BINDER DISPERSIONS

BACKGROUND OF THE INVENTION

The invention relates to aqueous crosslinkable binder dispersions comprising hydroxy- and acid-functional copolymers based on ethylene glycol monoallyl ether, to a process for preparing them and to the use of the dispersions in coating materials.

It is known and is widespread practice in the coatings industry to use binders based on hydroxy-functional copolymers in coating systems. These binders can be used in organically dissolved form, as an aqueous dispersion, and in water-dilutable form in solventborne or aqueous coating materials. It is possible to crosslink these copolymers-in the coating material via the OH groups, using for example melamine resins or (blocked) polyisocyanates, to form coating materials which can be processed as one-component or two-component systems.

Aqueous coating systems are increasingly being used in order to lower the emissions of volatile organic compounds (VOCs). As compared with the solvent-based coating materials, they contain a significantly reduced fraction of organic solvents ("cosolvents"). Often, however, the changeover to aqueous coating systems can result in deterioration in other coating properties, for example the solvent resistance and chemical resistance. The reason for this is the higher hydrophilicity of the aqueous or water-dilutable binders as compared with their solvent-based counterpart.

One requirement which is particularly difficult to fulfil is that of anti-graffiti resistance, i.e., the paint sprays, color sticks or paint sticks which are, for example, commercially customary leave behind spots of color in the paint film which cannot be removed using cleaning products without damaging the paint film (for example, impairing the gloss) (the requirements are described, for example, in TL 918 300, section 4.11, Deutsche Bahn AG). The resistance of aqueous coatings based on hydroxy-functional copolymer dispersions can be improved by combining them in the coating material with polyisocyanates containing free NCO groups, as crosslinkers, to form aqueous two-component polyurethane (2K-PU) coating materials. Such coating materials are described, for example, in EP-A 0 358 979 or in EP-A 0 947 557. The copolymers on which these coating dispersions are based are prepared by free-radical polymerization of vinyl monomers in aqueous phase, referred to as primary dispersions, or in organic phase with subsequent dispersion in water, referred to as secondary dispersions. The monomer mixtures generally include hydroxy (meth)acrylate monomers as building blocks for the OH functionality of the resin. This produces coating films having a high level of coatings properties overall, and yet the anti-graffiti resistance of these coating films does not meet the requirements.

U.S. Pat. No. 5,475,073 discloses hydroxy-functional copolymer resins in which the OH groups have been introduced by incorporating allyl alcohol or propoxylated allyl alcohol. EP-A 0 900 243 and WO-A 00/00527 describe water-dilutable, hydroxy-functional resins for coating compositions, the OH groups having been introduced into the resins by incorporating propoxylated allyl alcohol.

WO-A 99/51658 discloses two-component polyurethane coating materials comprising aqueous dispersions of polyisocyanates containing free NCO groups and hydroxy-functional resins, based on allyl alcohol or on an alkoxylated allyl alcohol.

An object of the present invention was to provide binder dispersions based on hydroxy-functional resins with which it is possible to prepare aqueous 2K-PU coating materials having good film optical properties and good resistance properties, in particular very good anti-graffiti resistance.

DESCRIPTION OF THE INVENTION

It has been possible to achieve the above-noted object by the coating materials comprising aqueous binder dispersions based on hydroxy- and acid-functional copolymers wherein ethylene glycol monoallyl ether is used as a hydroxy monomer.

The invention accordingly provides aqueous crosslinkable binder dispersions comprising hydroxy- and acid-functional copolymers wherein ethylene glycol monoallyl ether (a1) is used as a hydroxy functional monomer.

The copolymer is preferably produced from a monomer mixture comprising:

(a1) ethylene glycol monoallyl ether,
(a2) one or more acid-functional polymerizable monomers,
(a3) one or more polymerizable monomers containing cyclic groups and
(a4) one or more further polymerizable monomers,
(a5) if desired, one or more OH- and/or NH-functional polymerizable monomers, provided that (a3), (a4) and (a5) are different from each other and are different from (a1) and (a2).

The copolymer is preferably produced from a monomer mixture comprising:

(a1) from 5 to 60% by weight, more preferably from 10 to 50% by weight, and most preferably from 20 to 45% by weight, of ethylene glycol monoallyl ether,
(a2) from 0.5 to 10% by weight, more preferably from 1 to 5% by weight, and most preferably from 1.5 to 4% by weight, of one or more acid-functional polymerizable monomers,
(a3) from 5 to 60% by weight, more preferably from 10 to 50% by weight, and most preferably from 15 to 40% by weight, of one or more polymerizable monomers containing cyclic groups,
(a4) from 5 to 60% by weight, more preferably from 10 to 50% by weight, and most preferably from 15 to 40% by weight, of one or more further polymerizable monomers,
(a5) from 0 to 40% by weight, more preferably from 0 to 25% by weight, and most preferably from 0 to 10% by weight, of one or more OH- and/or NH-functional polymerizable monomers, the sum of the components adding up to 100% by weight and provided that (a3), (a4) and (a5) are different from each other and are different from (a1) and (a2).

Another preferred copolymer is produced from a mixture comprising:

(a1) ethylene glycol monoallyl ether,
(a2) one or more acid-functional polymerizable monomers,
(a3) one or more polymerizable monomers containing cyclic groups,
(a4) one or more further polymerizable monomers,
(a5) if desired, one or more OH- and/or NH-functional polymerizable monomers, and
(a6) at least one or more polyester oligomers, provided that (a3), (a4), (a5) and (a6) are different from each other and are different from (a1) and (a2).

Particularly preferred is a copolymer is produced from a mixture comprising:

(a1) from 5 to 60% by weight, and more preferably from 20 to 50% by weight, of ethylene glycol monoallyl ether, (a2) from 0.5 to 10% by weight, and more preferably from 1 to 5% by weight, of one or more acid-functional polymerizable monomers, (a3) from 5 to 60% by weight, and more preferably from 5 to 50% by weight, of one or more polymerizable monomers containing cyclic groups, (a4) from 5 to 60% by weight, and more preferably from 5 to 30% by weight, of one or more further polymerizable monomers, (a5) from 0 to 40% by weight, and more preferably from 15 to 25% by weight, of one or more OH- and/or NH-functional polymerizable monomers, and (a6) from 10 to 50% by weight, and more preferably from 10 to 45% by weight, of one or more polyester oligomers, the sum of the components adding up to 100% by weight and provided that (a3), (a4), (a5) and (a6) are different from each other and are different from (a1) and (a2).

Ethylene glycol monoallyl ether is used as monomer (a1). Component (a1) may be prepared, for example, in accordance with U.S. Pat. No. 4,618,703 (col. 2, line 56–col. 3, line 56) or Jungk et al., Organic Preparations and Procedures International 1983, 15 (3), 152 f.

Component (a2) suitably includes unsaturated free-radically polymerizable compounds containing carboxyl/carboxylate groups or sulphonic acid/sulphonate groups. Examples of such acid-functional monomers (a2) include, for example, acrylic acid, methacrylic acid, β-carboxyethyl acrylate, crotonic acid, fumaric acid, maleic acid (anhydride), itaconic acid, monoalkyl esters of dibasic acids/anhydrides (such as, for example, maleic acid monoalkyl esters), and also the olefinically unsaturated monomers which contain sulphonic acid/sulphonate groups [described in WO-A 00/39181 (p. 8 line 13–p. 9 line 19)], among which 2-acrylamido-2-methylpropanesulphonic acid may be mentioned by way of example. Preference is given to using carboxy-functional monomers, with particular preference acrylic acid and/or methacrylic acid.

Examples of suitable polymerizable monomers containing cyclic groups (a3) include cyclohexyl (meth)acrylate, cyclohexyl (meth)acrylates substituted on the ring by alkyl groups, isobornyl (meth)acrylate or norbornyl (meth)acrylate, but also styrene, vinyltoluene or α-methylstyrene. Preference is given to using isobornyl (meth)acrylate and/or styrene.

Examples of suitable monomers (a4) are (meth)acrylic esters having $C_1$ to $C_{18}$ hydrocarbon radicals in the alcohol moiety, for example ethyl acrylate, n-butyl acrylate, isobutyl acrylate, 2-ethylhexyl acrylate, methyl methacrylate, ethyl methacrylate, butyl methacrylate, 2-ethylhexyl methacrylate, but also vinyl esters, vinyl monomers containing alkylene oxide units, such as condensation products of (meth)acrylic acid with oligoalkylene oxide monoalkyl ethers, for example, and also monomers containing further functional groups such as, for example, epoxy groups, alkoxysilyl groups, urea groups, urethane groups, amide groups or nitrile groups. It is also possible to use difunctional and high polyfunctional (meth)acrylate monomers and/or vinyl monomers such as, for example, hexanediol di(meth)acrylate in amounts of 0–2% by weight based on the sum of the monomers (a1) to (a6). Preference is given to using methyl methacrylate, n-butyl acrylate, n-butyl methacrylate or 2-ethylhexyl acrylate.

Component (a5) suitably includes in principle OH- or NH-functional monomers having polymerizable C=C double bonds. Preference is given to hydroxy-functional monomers. Examples of suitable hydroxy-functional monomers (a5) are hydroxyethyl methacrylate, hydroxypropyl methacrylate, hydroxyethyl acrylate, hydroxypropyl acrylate, hydroxybutyl acrylate, hydroxybutyl methacrylate or hydroxy monomers containing alkylene oxide units, such as adducts of ethylene oxide, propylene oxide or butylene oxide with (meth)acrylic acid, for example. Preference is given to using hydroxyethyl acrylate, hydroxyethyl methacrylate, hydroxybutyl acrylate or hydroxybutyl methacrylate.

Suitable polyesters (a6) are those compounds having an average molecular weight ($M_n$) of from 500 to 3000 and preferably from 750 to 1500, an acid number of from 0 to 15 mg KOH/g, preferably from 5 to 10 mg KOH/g, and an OH number of from 50 to 300, preferably from 100 to 200 mg KOH/g. The polyesters (a6) further have an unsaturated C=C double bond (MW=24) content of from 0.1 to 1.1% by weight, preferably from 0.2 to 0.4% by weight.

The polyesters which are used as component (a6) are prepared by conventional polycondensation of (I) from 0 to 40% by weight, preferably from 0 to 20% by weight and and most preferably from 0 to 5% by weight of one or more aliphatic, saturated or unsaturated monocarboxylic acids having 8–30 carbon atoms, (II) from 0.6 to 5% by weight, preferably from 0.6 to 2% by weight of an α,β-unsaturated monocarboxylic or dicarboxylic acid having 3 to 8 carbon atoms and/or anhydrides thereof, (III) from 20 to 60% by weight, preferably from 25 to 55% by weight of one or more aliphatic, cycloaliphatic or aromatic dicarboxylic, tricarboxylic or tetracarboxylic acids having from 2 to 40 carbon atoms and/or anhydrides thereof, (IV) from 20 to 60% by weight, preferably from 25 to 55% by weight of one or more aliphatic alcohols having from 1 to 4 OH groups per molecule, (V) from 0 to 10% by weight, preferably from 0 to 1% by weight of one or more aromatic monocarboxylic acid(s), (VI) from 0 to 10% by weight, preferably from 0 to 5% by weight of further COOH- or OH-reactive compounds such as, for example, epoxides, isocyanates, amines or oxazolines having from 1 to 4, preferably from 1.9 to 2.5 functional groups per molecule, the sum of all the components being 100% by weight.

The reaction of components (I) to (VI) may take place where appropriate with the assistance of customary esterification catalysts, preferably in accordance with the principle of a melt condensation or azeotropic condensation at temperatures of from 140° C. to 240° C. with elimination of water.

As component (I) the polyester component (a6) of the binder dispersion of the invention comprises, where appropriate, one or more aliphatic monocarboxylic acids having from 8 to 30 carbon atoms. Examples of saturated monocarboxylic acids having from 8 to 30 carbon atoms are 2-ethylhexanoic acid, octanoic acid (caprylic acid), decanoic acid (capric acid), dodecanoic acid (lauric acid), hexadecanoic acid (cetylic acid) or octadecanoic acid (stearic acid). Also suitable are aliphatic, mono- or polyunsaturated monocarboxylic acids having from 8 to 30 carbon atoms such as, for example, oleic aid, linoleic acid or linolenic acid. It is preferred to use mixtures of monocarboxylic acids as formed in the saponification of natural oils and fats. Examples of such fatty acids are soya oil fatty acid, tall oil fatty acid, linseed oil fatty acid, castor oil fatty acid, coconut oil fatty acid, groundnut oil fatty acid or safflower oil fatty acid. Particular preference is given to monocarboxylic acids obtained by saponifying naturally occurring non-drying oils and/or fats. Examples of such oils and fats are coconut oil, palm kernel oil and groundnut oil. Additionally suitable examples of monocarboxylic acids having from 8 to 30 carbon atoms are hydrogenated fatty acids, synthetic fatty acids from, for example, the oxidation of paraffin or the Koch synthesis (J. Falbe, New Syntheses with Carbon Monoxide, Berlin, Heidelberg, New York (1980), p. 372 ff.).

As component (II) the polyester component (a6) comprises α,β-unsaturated monocarboxylic or dicarboxylic acids having from 3 to 8 carbon atoms. Examples of such carboxylic acids are acrylic acid, methacrylic acid, itaconic acid, maleic acid, fumaric acid or tetrahydrophthalic acid. Instead of the free carboxylic acids it is also possible to use derivatives of carboxylic acids such as anhydrides or esters, for example, as starting material for preparing the polyesters. Maleic anhydride is preferred.

Suitable components (III) for the polyester component (a6) are aliphatic, cycloaliphatic or aromatic dicarboxylic, tricarboxylic or tetracarboxylic acids having from 2 to 40 carbon atoms such as, for example, phthalic acid, isophthalic acid or terephthalic acid and also pyromellitic acid, trimellitic acid and succinic acid, adipic acid, sebacic acid, azelaic acid. Likewise suitable are dimer fatty acids prepared from natural or synthetic fatty acids. Instead of the free carboxylic acids it is also possible to use derivatives of carboxylic acids such as anhydrides or esters, for example, as starting material for preparing the polyesters. Preference is given to using dicarboxylic acids such as, for example, phthalic acid, isophthalic acid, terephthalic acid, succinic acid, adipic acid, sebacic acid or azelaic acid.

As OH components (IV) having from 1 to 4 OH groups per molecule it is possible, for example, to use aliphatic monoalcohols such as butanol, pentanol or 2-ethylhexanol. Likewise suitable are 'fatty alcohols' as formed during the reduction of fatty acids. Examples of alcohol components having 2 OH groups are ethylene glycol, neopentyl glycol, 1,4-butanediol, 1,6-hexanediol, trimethylpentanediol, 1,4-cyclohexanedimethanol, diethylene glycol, triethylene glycol, tripropylene glycol or hydrogenated bisphenol. Preferred OH components (IV) used are alcohol components with a functionality of three or more, where appropriate in combination with dihydric alcohols. By way of example mention may be made of pentaerythritol, glycerol or trimethylolpropane.

Suitable monocarboxylic acids (V) include, for example, benzoic acid or alkylbenzoic acids.

The polyester component (a6) is customarily prepared by polycondensation as described in the literature (R. Dhein, K. Reuter, G. Ruf in 'Houben-Weyl, Methoden der Organischen Chemie Vol. E20/2', ed.: H. Bartl, J. Falbe, 4th edition, pp. 1429–1435, Stuttgart, N.Y. (1987)). It is, however, also possible additionally to carry out reaction with further compounds (VI), e.g. OH-reactive compounds such as polyisocyanates or COOH-reactive compounds such as substances containing epoxide, amino or oxazoline groups and so to modify the polyester. Suitable polyisocyanates include preferably aliphatic polyisocyanates such as hexamethylene diisocyanate, isophorone diisocyanate, methylenebis(4-isocyanatocyclohexane), tetramethylxylylene diisocyanate or modified aliphatic types such as polyisocyanates containing isocyanurate, uretdione or biuret groups. Suitable in principle alongside these are aromatic polyisocyanates such as tolylene diisocyanate or methylenebis(4-isocyanatobenzene). Examples of suitable epoxides are epoxy resins based on bisphenol A diglycidyl ether or else Cardura® E 10 (glycidyl ester of a mixture of highly branched monocarboxylic acids having 10 carbon atoms; Versatic® 10, from Resolution Nederland B.V., Hoogvliet, Netherlands). Suitable amines are, for example, hexamethylenediamine, isophoronediamine, diethylenetriamine or ethylenediamine.

The preparation of the aqueous binder dispersions of the invention takes place by reacting components (a1) to (a5) to form the copolymer or reacting components (a1) to (a6) to form the copolymer and transferring the copolymer to the aqueous phase, the acid groups being subjected to at least partial neutralization before or during the dispersing operation.

The copolymers of the invention may in principle be prepared by conventional polymerization processes. Preferably, however, the preparation takes place by polymerization in organic phase with subsequent dispersing of the resin into the aqueous phase, the acid groups being subjected to at least partial neutralization before or during the operation of dispersing the resin. It is particularly preferred to prepare the copolymer by a multistage polymerization process as described, for example, in EP-A 0 947 557 (p. 3 line 2–p. 4 line 15) or in EP-A 1 024 184 (p. 2 line 53–p. 4 line 9), in which first of all a comparatively hydrophobic monomer mixture which has a low acid group content or is free from acid groups, and then at a later point in time in the polymerization, a more hydrophilic monomer mixture containing acid groups, is metered in.

Where component (a6) is used in the preparation of the copolymer, it may be in solution in the hydrophobic moiety, but also, additionally, may have been dissolved proportionally in the hydrophilic moiety. With preference, however, component (a6) is introduced at the beginning. With particular preference, component (a6) is introduced at the beginning together with component (a1), it being possible for component (a6) to contain cosolvents, although it is preferably free from cosolvent. Subsequently, components (a2) to (a4) and, where appropriate, (a5), are metered into the initially introduced component (a6), as described in EP-A 0 947 557 (p. 3 line 2–p. 4 line 15) or in EP-A 1 024 184 (p. 2 line 53–p. 4 line 9), and polymerization is conducted. The hydrophilic polymer is prepared in the presence of the hydrophobic polymer.

Instead of a multistage polymerization process it is likewise preferred to conduct the operation continuously (gradient polymerization); that is, a monomer mixture or monomer/polyester mixture is added with changing composition, the hydrophilic monomer fractions being higher towards the end of the feed than at the beginning.

In view of the known relatively poor free-radical polymerizability of vinyl ethers and allyl ethers in comparison to (meth)acrylate monomers (for example, B. Vollmert, Grundriss der Makromolekularen Chemie, I, 87) and the resultant relatively low rate of incorporation of the ethylene glycol monoallyl ether (a1) in comparison to the other components (a6), (a2) to (a4) and (a5), it is particularly preferred to introduce some or all of component (a1) at the beginning of the polymerization and to meter in the remainder of the monomer mixture as described above. This also has the advantage that the ethylene glycol monoallyl ether (a1) is in this way able to replace some or all of the cosolvent which is otherwise necessary as an initial tank charge, as the reaction medium for polymerization. Alternatively (in the case of a correspondingly lower incorporation rate), component (a1) can be metered in simultaneously with the other monomers. The rate of incorporation of (a1) may also be influenced by means of the reaction conditions (pressure, temperature). Any residual amounts of unincorporated (a1) may easily be removed, where appropriate, after the end of the polymerization by distillation, and used again.

The copolymerization is generally conducted at from 90 to 180° C., preferably at from 100 to 160° C.

The reaction may be conducted in the presence of organic solvents. Suitable such solvents are any desired solvents which are known in paint technology, preferably those which are commonly employed as cosolvents in aqueous dispersions, such as, for example, alcohols, ethers, alcohols containing ether groups, esters, ketones, N-methylpyrrolidone or apolar hydrocarbons or mixtures of these solvents. The solvents are used in amounts such that their quantity in the finished dispersion is 0–12% by weight, preferably 0–6% by weight, with particular preference 0–1% by weight. Where necessary, the solvents used may also be partly removed again by means of a distillation, if particularly low organic solvent contents are called for.

Suitable initiators for the polymerization reaction include organic peroxides such as, for example, di-tert-butyl peroxide or tert-butyl peroxy-2-ethylhexanoate and azo compounds. The amounts of initiator used depend on the desired molecular weight. For reasons of operational reliability and greater ease of handling, peroxide initiators may also be used in the form of a solution in suitable organic solvents of the abovementioned type.

The number-average molecular weight $M_n$ of the copolymers may be controlled through a targeted choice of the operational parameters, e.g. of the molar monomer-initiator ratio, of the reaction time or of the temperature, and is generally situated between 500 and 30 000, preferably between 500 and 20 000, with particular preference between 500 and 15 000. The OH content of the copolymers is from 2 to 10% by weight, preferably from 2.5 to 8.5% by weight, and most preferably from 3 to 7% by weight, and is determined by relative amount of the hydroxy-functional monomers used.

The amount of acid groups formed by the sum of carboxyl/carboxylate and sulphonic acid/sulphonate groups in the copolymer is from 5 to 100 meq/100 g, preferably from 10 to 80 meq/100 g and most preferably from 20 to 60 meq/100 g, and is determined by the relative amount of the acid-functional monomers employed. Where appropriate, for hydrophilicization, the copolymer may contain, additionally to the acid groups, and proportionally, monomer units containing alkylene oxide, in incorporated form, or else external emulsifiers. Preferably, however, the copolymers are hydrophilicized only by means of acid groups.

For the neutralization of the acid groups incorporated by copolymerization in the copolymer, it is possible to use organic amines or water-soluble inorganic bases (e.g. soluble metal hydroxides). Examples of suitable amines are N-methylmorpholine, triethylamine, diisopropylethylamine, dimethylethanolamine, dimethylisopropanolamine, methyldiethanolamine, diethylethanolamine, butanolamine, morpholine, 2-aminomethyl-2-methylpropanol or isophoronediamine. Ammonia can also be used as well. The neutralizing agent is added in amounts such that the degree of neutralization (i.e. the molar ratio of neutralizing agent to acid) is from 40 to 150%, preferably from 60 to 120%. The pH of the aqueous binder dispersion of the invention is from 6.0 to 11.0, preferably from 6.5 to 9.0.

The aqueous crosslinkable binder dispersions of the invention have a solids content of from 25 to 60%, preferably from 30 to 50%, and an organic solvent content of from 0 to 12%, preferably from 0 to 6%. As described earlier on above, it is possible by means of the present invention to prepare aqueous dispersions which are virtually cosolvent-free.

Besides the copolymer, the binder dispersions of the invention may where appropriate comprise other binders or dispersions as well, based for example on polyesters, polyurethanes, polyethers, polyepoxides or polyacrylates and, where appropriate, pigments and other additives and auxiliaries which are known in the paints industry.

The binder dispersions of the invention can be processed to aqueous coating compositions. Consequently, aqueous coating compositions comprising the binder dispersions of the invention and also at least one crosslinker, preferably a polyisocyanate crosslinker, with particular preference a polyisocyanate crosslinker containing free NCO groups, are likewise provided by the present invention.

Through combination with crosslinkers it is possible in this case, depending on the reactivity or, where appropriate, the blocking of the crosslinkers, to prepare both one-component coating materials and two-component coating materials. For the purposes of the present invention, one-component coating materials are coating compositions in which binder component and crosslinker component can be stored together without any crosslinking reaction occurring to a marked extent or an extent which is detrimental to the subsequent application. The crosslinking reaction takes place only on application, following activation of the crosslinker. This activation can be produced, for example, by raising the temperature. Two-component coating materials are, for the purposes of the present invention, coating compositions in which binder component and crosslinker component have to be stored in separate vessels owing to their high reactivity. The two components are not mixed until shortly before application when they react generally without additional activation. In order to accelerate the crosslinking reaction, however, it is also possible to use catalysts or to employ higher temperatures.

Examples of suitable crosslinkers are polyisocyanate crosslinkers, amide- and amine-formaldehyde resins, phenolic resins, aldehyde resins and ketone resins, such as phenol-formaldehyde resins, for example, resoles, furan resins, urea resins, carbamic ester resins, triazine resins, melamine resins, benzoguanamine resins, cyanamide resins, and aniline resins, as described in "Lackkunstharze", H. Wagner, H. F. Sarx, Carl Hanser Verlag Munich, 1971.

As crosslinkers it is preferred to use polyisocyanates containing free and/or blocked NCO groups, since the aqueous one-component and two-component polyurethane coating materials obtained exhibit a particularly high level of coatings properties. Suitable such crosslinker resins include blocked polyisocyanates based, for example, on isophorone diisocyanate, hexamethylene diisocyanate, 1,4-diiso-cyanatocyclohexane, bis(4-iso-cyanatocyclohexane)methane or 1,3-diiso-cyanatobenzene, or based on paint polyisocyanates such as biuret-group-containing or isocyanurate-group-containing polyisocyanates of 1,6-diisocyanatohexane, isophorone diisocyanate or bis(4-isocyanatocyclohexane)methane or urethane-group-containing paint polyisocyanates based on 2,4- and/or 2,6-diisocyanatotoluene or isophorone diisocyanate, on the one hand, and low molecular mass polyhydroxyl compounds such as trimethylolpropane, the isomeric propanediols or butanediols, or any desired mixtures of such polyhydroxyl compounds, on the other.

Examples of suitable blocking agents for these polyisocyanates are monohydric alcohols such as methanol, ethanol, butanol, hexanol, cyclohexanol, benzyl alcohol, oximes such as acetoxime, methyl ethyl ketoxime, cyclohexanone oxime, lactams such as ε-caprolactam, phenols, amines, such as diisopropylamine or dibutylamine, dimethylpyrazole or triazole, and also dimethyl malonate, diethyl malonate or dibutyl malonate.

Preference is given to using hydrophobic or hydrophilicized polyisocyanates of low viscosity which contain free isocyanate groups and are based on aliphatic, cycloaliphatic, araliphatic and/or aromatic isocyanates, preferably aliphatic or cycloaliphatic isocyanates, since in that way it is possible to obtain a coating film having a particularly high level of resistance. These polyisocyanates generally have a viscosity of from 10 to 3500 mPas at 23° C. Where necessary, the polyisocyanates may be employed in the form of a blend with small amounts of inert solvents in order to lower the viscosity to a level within the stated range. Triisocyanatononane as well may be used, alone or in mixtures, as a crosslinker component.

The copolymer described here is generally sufficiently hydrophilic, so that the dispersibility of the crosslinker resins, provided that they are not substances which are water-soluble or water-dispersible in any case, is ensured.

Water-soluble or dispersible blocked polyisocyanates are obtainable, for example, by modification with carboxylate and/or polyethylene oxide groups and/or polyethylene oxide/polypropylene oxide groups. Hydrophilicization of the polyisocyanates is possible, for example, by reaction with substoichiometric amounts of monohydric hydrophilic polyether alcohols. The preparation of polyisocyanates hydrophilicized in this way is described, for example, in EP-A 0 540 985, p. 3, line 55–p. 4 line 5. Also highly suitable are the polyisocyanates described in EP-A-959087, p. 3 lines 39–51, which contain allophanate groups and are prepared by reacting low-monomer-content polyisocyanates with polyethylene oxide polyether alcohols under allophanatization conditions. Also suitable are the water-dispersible, triisocyanatononane-based polyisocyanate mixtures that are described in DE-A 100 078 21, p. 2 line 66–p. 3 line 5. Likewise possible is hydrophilicization through the addition of commercially customary emulsifiers.

Particular preference in the context of the invention is given to using non-hydrophilicized polyisocyanate crosslinkers of low viscosity, since in particular in the context of the anti-graffiti resistance it is possible in this way to attain a very high level.

Also suitable in principle, of course, is the use of mixtures of different crosslinker resins.

Before, during or after the preparation of the aqueous binder dispersion of the invention by blending the individual components (a1) to (a5) or (a1) to (a6), and also in the case where the coating compositions are prepared by adding at least one crosslinker, it is possible to add the customary auxiliaries and adjuvants of paint technology, such as defoamers, thickeners, pigments, dispersing auxiliaries, catalysts, anti-skinning agents, anti-settling agents or emulsifiers, for example.

The aqueous coating compositions thus obtained, comprising the binder dispersions of the invention, are suitable for all applications where aqueous paint and coating systems are used with stringent requirements imposed on the resistance of the films, examples being the coating of surfaces of mineral building materials, the coating and sealing of wood and wood materials, the coating of metallic surfaces (metal coating), the coating and varnishing of coverings containing asphalt or bitumen, the coating and sealing of various plastics surfaces (plastics coating), and also high-gloss coating materials.

Likewise provided by the present specification are substrates coated with aqueous coating compositions comprising the binder dispersions of the invention.

The aqueous coating compositions comprising the binder dispersions of the invention are used for preparing primers, surfacers, pigmented or transparent topcoat materials, clearcoat materials and high-gloss coating materials, and also one-coat coating materials, which may be employed in individual application and production-line application, in the field, for example, of industrial coating, automotive OEM finishing and automotive refinish.

Preferred uses of the aqueous coating compositions comprising the binder dispersions of the invention, preferably in combination with polyisocyanates or with particular preference in combination with non-hydrophilicized polyisocyanates of low viscosity, is the coating or painting of metallic surfaces or plastics at from room temperature to 140° C. These coatings combine very good film optical qualities with a high level in solvent resistance and chemical resistance, especially excellent anti-graffiti resistance.

The coating can be produced by any of a wide variety of spraying techniques such as, for example, air pressure spraying, airless spraying or electrostatic spraying techniques, using one-component or, where appropriate, two-component spraying units. The paints and coating materials comprising the binder dispersions of the invention may also, however, be applied by other methods, such as by brushing, rolling or knifecoating, for example.

The invention is further illustrated but is not intended to be limited by the following examples in which all parts and percentages are by weight unless otherwise specified.

EXAMPLES

All figures in % are by weight. Viscosity measurements were carried out in a cone and plate viscometer in accordance with DIN 53019 at a shear rate of $40s^{-1}$.

Example 1

Preparation of an Inventive Hydroxyl-containing Dispersion

A 6 l reaction vessel with stirring, cooling and heating apparatus is charged with a mixture (I) of 990 g of ethylene glycol monoallyl ether, 83.2 g of methyl methacrylate, 83.3 g of isobornyl methacrylate, 3.5 g of acrylic acid and 10.8 g of di-tert-butyl peroxide and this initial charge is heated to 143° C.

Then a mixture (II) of 407.2 g of methyl methacrylate and 407.3 g of isobornyl methacrylate and, in parallel, 39.2 g of di-tert-butyl peroxide is metered in at the same temperature and with stirring over the course of 4.5 h. After a further 30 min at 143° C., a mixture (IV) of 217.5 g of methyl methacrylate, 190 g of butyl acrylate and 60 g of acrylic acid and, again in parallel, a solution of 8 g of di-tert-butyl peroxide in 16 g of Solvent Naphtha® 100 are metered in at a uniform rate over the course of 1.5 h, followed by stirring at reaction temperature for 60 min more.

Subsequently, unreacted ethylene glycol monoallyl ether is distilled off in vacuo. (max. 140° C./20 mbar). This gives 89.8 g of distillate, i.e. 9% of the amount of ethylene glycol monoallyl ether used. The GC analysis of the resin obtained shows a residual free ethylene glycol monoallyl ether content of less than 0.5% by weight.

1204 g of this resin are subsequently neutralized with 35.3 g of dimethylethanolamine at 95° C. and, by adding 2300 g of distilled water, dispersion is carried out to give a stable aqueous dispersion having a solids content of 33.6% with a viscosity of 4350 mPas and a pH of 7.7. The dispersion is virtually cosolvent-free. The OH content of the resin (100%) is 6.1% (OH number 201 mg KOH/g), the acid number (100%) is 21.5 mg KOH/g.

Example 2

Preparation of an Inventive Hydroxyl-containing Dispersion

Example 1 is repeated with the difference that 990.5 g of the resin obtained after distillation are mixed with 87.4 g of Solvent Naphtha® 100 and 87.4 g of butyl glycol at 95° C. Subsequently neutralization is carried out with 29.0 g of dimethylethanolamine at 95° C. and dispersion is carried out by adding 1850 g of distilled water to give a stable aqueous dispersion having a solids content of 32.3% with a viscosity of 1560 mPas and a pH of 7.9. The dispersion has a cosolvent content of 5.7%. The OH content of the resin (100%) is 6.1% (OH number 201 mg KOH/g), the acid number (100%) 22 mg KOH/g.

Example 3

Preparation of an Inventive Hydroxyl-containing Dispersion

A 6 l reaction vessel with stirring, cooling and heating apparatus is charged with a mixture (I) of 750 g of ethylene glycol monoallyl ether, 83.2 g of methyl methacrylate, 83.3 g of isobornyl methacrylate, 10.8 g of di-tert-butyl peroxide and 78 g of butyl glycol and this initial charge is heated to 143° C.

Then a mixture (II) of 407.2 g of methyl methacrylate, 407.3 g of isobornyl methacrylate, 125 g of butyl acrylate and 115 g of styrene and, in parallel, a solution of 39.2 g of di-tert-butyl peroxide in 39 g of butyl glycol is metered in at the same temperature and with stirring over the course of 4.5 h. After a further 30 min at 143° C., a mixture (IV) of 217.5 g of methyl methacrylate, 190 g of butyl acrylate and 60 g of acrylic acid and, again in parallel, a solution of 8 g of di-tert-butyl peroxide in 8 g of butyl glycol are metered in at a uniform rate over the course of 1.5 h, followed by stirring at reaction temperature for 60 min more.

Subsequently, unreacted ethylene glycol monoallyl ether is distilled off in vacuo (max. 140° C./20 mbar), in the course of which the greatest part of the butyl glycol is also removed. This gives 75 g of distillate, which contains about 2 g, i.e. about 0.3% of the amount of ethylene glycol monoallyl ether used (remainder: butyl glycol). The GC analysis of the resin obtained shows a residual free ethylene glycol monoallyl ether content of 0.8% by weight and also a residual butyl glycol content of 1% by weight. This resin melt is subsequently dissolved in 206 g of Solvent Naphtha 100.

1243 g of this resin melt are heated to 95° C. and neutralized with 22.7 g of dimethylethanolamine; subsequently 1250 g of distilled water are added. This gives a stable aqueous dispersion having a solids content of 45.5% and an average particle size of 126 nm with a viscosity of 2500 mPas and a pH of 7.6. The dispersion has a cosolvent content of 4%. The OH content of the resin (100%) is 4.1% (OH number 134 mg KOH/g), the acid number (100%) is 18 mg KOH/g.

Example 4

Preparation of an Inventive Hydroxyl-containing Dispersion

A 6 l reaction vessel with stirring, cooling and heating apparatus is charged with a mixture (I) of 990 g of ethylene glycol monoallyl ether, 83.2 g of methyl methacrylate, 83.3 g of isobornyl methacrylate, 3.5 g of acrylic acid and 10.8 g of di-tert-butyl peroxide and this initial charge is heated to 143° C.

Then a mixture (II) of 407.2 g of methyl methacrylate and 407.3 g of isobornyl methacrylate and, in parallel, 39.2 g of di-tert-butyl peroxide is metered in at the same temperature and with stirring over the course of 4.5 h. After a further 30 min at 143° C., a mixture (IV) of 217.5 g of methyl methacrylate, 205 g of butyl acrylate and 45 g of acrylic acid and, again in parallel, a solution of 8 g of di-tert-butyl peroxide in 16 g of Solvent Naphtha® 100 are metered in at a uniform rate over the course of 1.5 h, followed by stirring at reaction temperature for 60 min more.

Subsequently, unreacted ethylene glycol monoallyl ether is distilled off in vacuo (max. 140° C./20 mbar). This gives 100.5 g of distillate, i.e. 10% of the amount of ethylene glycol monoallyl ether used. The GC analysis of the resin obtained shows a residual free ethylene glycol monoallyl ether content of 0.7% by weight.

This resin melt is subsequently dissolved in 195.8 g of Solvent Naphtha 100, neutralization is carried out with 54.3 g of dimethylethanolamine at 95° C. and subsequently 4550 g of distilled water are added. This gives a stable aqueous dispersion having a solids content of 33.2% with a viscosity of 2400 mPas and a pH of 8.0. The dispersion has a cosolvent content of 2.7%. The OH content of the resin (100%) is 5.9% (OH number 195 mg KOH/g), the acid number (100%) is 15 mg KOH/g.

Example 5

Preparation of an Inventive Hydroxyl-containing Dispersion a) Preparation of the polyester resin:
In a 15 l reaction vessel with stirring, cooling and heating apparatus and also water separator, 1665 g of trimethylolpropane and 5161 g of neopentyl glycol are melted under a nitrogen atmosphere at 120° C. Subsequently, at 120° C., 189 g of maleic anhydride, 5581 g of phthalic anhydride and 2065 g of isophthalic acid are weighed in. Nitrogen is passed through the reaction mixture. The batch is heated to 210° C. in 6 h. At this temperature a strong stream of nitrogen (about 30 l/h) is passed through the batch and condensation is carried out until the acid number has fallen to below 8 mg KOH/g. The OH number is 133 mg KOH/g, the acid number 7.5 mg KOH/g.

b) Preparation of the dispersion:
A 6 l reaction vessel with stirring, cooling and heating apparatus is charged with a mixture (I) of 450 g of ethylene glycol monoallyl ether, 700 g of the polyester resin a), 13.3 g of methyl methacrylate, 8.7 g of styrene, 1.3 g of n-butyl acrylate and 29.3 g of hydroxypropyl acrylate at 140° C. Added dropwise to the mixture (I) over the course of 4 h is an initiator solution comprising 39.0 g of di-tert-butyl peroxide dissolved in 78.0 g of butyl glycol, the temperature being held at 140° C. 5 minutes after the beginning of the metered addition of initiator, a mixture (II) of 120.0 g of methyl methacrylate, 78.0 g of styrene, 12.0 g of n-butyl acrylate and 264.0 g of hydroxypropyl acrylate is metered in in parallel over the course of 2 h at a reaction temperature of 140° C. Following the metered addition of mixture (II), a mixture (III) of 66.7 g of methyl methacrylate, 43.3 g of styrene, 6.7 g of n-butyl acrylate, 146.7 g of hydroxypropyl acrylate and 60 g of acrylic acid is metered in over the course of 1 h at a reaction temperature of 140° C. After all of the initiator solution has been metered in, stirring is continued at 140° C. for one hour more and then unreacted ethylene glycol monoallyl ether is distilled off in vacuo (max. 145° C./20 mbar). This gives 123 g of distillate, consisting of about 10% of the amount of ethylene glycol monoallyl ether used and butyl glycol. GC analysis of the resin obtained shows a residual free ethylene glycol monoallyl ether content of <0.5% by weight.

The resin melt is neutralized with 61.8 g of dimethylethanolamine at 95° C. and subsequently 2070 g of distilled water are added. This gives a stable aqueous dispersion having a solids content of 43.2% with a viscosity of 2400 mPas and a pH of 7.6. The dispersion is cosolvent-free. The OH content of the resin (100%) is 7.7% (OH number 253 mg KOH/g), the acid number (100%) 26 mg KOH/g.

Example 6

Preparation of a Non-inventive Hydroxyl-containing Dispersion (Comparative)

A 6 l reaction vessel with stirring, cooling and heating apparatus is charged with a mixture (I) of 990 g of ethylene glycol monoallyl ether, 83.2 g of methyl methacrylate, 83.3 g of butyl acrylate, 3.5 g of acrylic acid and 10.8 g of di-tert-butyl peroxide and this initial charge is heated to 143° C.

Then a mixture (II) of 407.2 g of methyl methacrylate and 407.3 g of butyl acrylate and, in parallel, 39.2 g of di-tert-butyl peroxide is metered in at the same temperature and with stirring over the course of 4.5 h. After a further 30 min at 143° C, a mixture (IV) of 217.5 g of methyl methacrylate, 190 g of butyl acrylate and 60 g of acrylic acid and, again in parallel, a solution of 8 g of di-tert-butyl peroxide in 16 g of Solvent Naphtha 100 are metered in at a uniform rate over the course of 1.5 h, followed by stirring at reaction temperature for 60 min more.

Subsequently, unreacted ethylene glycol monoallyl ether is distilled off in vacuo (max. 140° C./20 mbar). This gives 124 g of distillate, i.e. about 12% of the amount of ethylene glycol monoallyl ether used. The GC analysis of the resin obtained shows a residual free ethylene glycol monoallyl ether content of less than 0.5% by weight.

Subsequently 1930 g of this resin melt are dissolved in a mixture of 170.3 g of Solvent Naphtha® 100 and 170.3 g of butyl glycol, neutralization is carried out with 57.2 g of dimethylethanolamine at 95° C. and then 2114 g of distilled water are added. This gives a stable aqueous dispersion having a solids content of 45.0% with a viscosity of 5100 mPas and a pH of 7.9. The dispersion has a cosolvent content of 7.9%. The OH content of the resin (100%) is 6.1%, the acid number (100%) 21 mg KOH/g.

Example 7

Preparation of a Non-inventive Hydroxyl-containing Dispersion (Comparative)

A 6 l reaction vessel with stirring, cooling and heating apparatus is charged with 186 g of butyl glycol and 186 g of Solvent Naphta and this initial charge is heated to 143° C. Then a mixture (I) of 875 g of methyl methacrylate, 445 g of hydroxyethyl methacrylate and 625 g of butyl acrylate is metered in over 3 hours followed directly thereafter by a mixture (II) of 128 g of methyl methacrylate, 180 g of hydroxyethyl methacrylate, 100 g of butyl acrylate and 60 g of acrylic acid metered in over 1½ hours. In parallel thereto, 88 g of di-tert-butyl peroxide in 70 g of a 1:1 mixture of butyl glycol and Solvent Naphta® are metered in over 5 hours. After a further 2 hours of stirring at 145° C., the batch is cooled to 100° C., 78 g of dimethylethanolamine are added, and the mixture is homogenized and dispersed in 2600 g of water. This gives a stable aqueous dispersion having a solids content of 45.6% with a viscosity of 1500 mPas and a pH of 8.1. The dispersion has a cosolvent content of 8%. The OH content of the resin (100%) is 3.3%, the acid number (100%) 21 mg KOH/g.

Application Example

Aqueous 2K PU Clearcoats

In accordance with the weighed amounts for introduction in Table 1, binder dispersion I and the additives II–IV are dispersed using a stirrer (about 10 minutes at about 2000 rpm) to give an aqueous stock varnish component, from which air is allowed to escape for one day. Following addition of distilled water to adjust to the target viscosity (approximately 40 s DIN 6 cup), air is again allowed to escape for one day. This stock varnish is subsequently admixed with, as crosslinker component V, an asymmetric hexamethylene diisocyanate trimer having an NCO content of 23.7% and a viscosity (in 100% form) of approximately 650 mpas, prepared in accordance with Ex. (1A) of WO-A/ 01/14092, dissolved in 3-methoxy-n-butyl acetate (solids content: 80%), which is incorporated using a stirrer at 2000 rpm for 2 min. The NCO:OH ratio is 1.5:1. The product is subsequently diluted with distilled water to a spray viscosity of approximately 25 s (DIN 4 cup).

Following application (spray gun HVLP NR 2000; 3.0–3.5 bar) to coil-coated metal sheets which have been coated with a commercial, water-thinnable or solventborne basecoat (e.g. Permahyd or Permacron; Spies Hecker), the coatings are flashed off at RT for 30 min, dried in an oven at 60° C. for 30 min and then dried at room temperature for 7–10 days. This gives glossy coating films for which the results of coatings testing are summarized in Tab. 1.

It can be seen that the aqueous 2K PU coatings based on the inventive dispersions from Ex. 1 and 2 combine very good film optical qualities, high hardness, very good solvent resistance and chemical resistance with excellent graffiti resistance. Coatings based on the non-inventive dispersions from Ex. 5 and 6 likewise exhibit a good level of properties, albeit with weaknesses in gloss and hardness (Disp. 5), and also solvent resistance and chemical resistance (Disp. 6). While the coatings based on the dispersions from Ex. 1 and 2 pass the Dt. Bundesbahn Graffiti Test (the Graffiti Test of the German Railway Service, in accordance with TL 918

300, Section 4.11) (10 cycles), the corresponding coatings based on Ex. 5 and especially 6 do not meet the requirements of this test.

TABLE 1

Varnish batch for aqueous 2K PU clearcoats

| Dispersion from Ex. | 1 | 2 | 6 | 7 |
|---|---|---|---|---|
| | Amount introduced in g: | | | |
| Varnish composition | | | | |
| I  Binder dispersion | 560.0 | 583.0 | 418.0 | 542.0 |
| II  Surfynol ® 104 BC[1] | 11.2 | 11.2 | 11.2 | 11.2 |
| III  Borchigel ® PW 25[2] | 1.5 | 1.5 | 1.5 | 1.5 |
| IV  Baysilone ® VP Al 3468[3], 10% in butyl glycol | 9.3 | 9.3 | 9.3 | 9.3 |
| V  Polyisocyanate (see text), 80% in 3-methoxybutyl acetate | 231.0 | 231.0 | 231.0 | 162.0 |
| Results of coating testing | | | | |
| Gloss (20°) | 85 | 86 | 82 | 84 |
| Levelling* | 1 | 1 | 1 | 1 |
| Drying T1/T3 [h] | 3/>7 | 3/>7 | 3/>7 | 3/>7 |
| Pendulum hardness 7 d RT [s] | 187 | 196 | 123 | 179 |
| Solvent resistance* | | | | |
| Water (60 min) | 0 | 0 | 1 | 2 |
| Super-grade petrol (5 min) | 1 | 1 | 2 | 3 |
| Methoxypropyl acetate (5 min) | 2 | 1 | 2 | 4 |
| Xylene (5 min) | 1 | 1 | 1 | 4 |
| Chemical resistance* | | | | |
| 2% $H_2SO_4$ (60 min) | 1 | 1 | 1 | 2 |
| 2% NaOH (60 min) | 1 | 1 | 1 | 2 |
| Graffiti resistance* to TL 918 300 Section 4.11 (1st cycle)** | | | | |
| Alkyd paint spray RAL 1021 dissolvability/loss of gloss | 1/0 | 1/0 | 3/1 | 3/1 |
| Acrylic paint spray RAL 6010 dissolvability/loss of gloss | 1/0 | 1/0 | 3/1 | 3/1 |
| Graffiti resistance * to TL 918 300 Section 4.11 (10th cycle)** | | | | |
| Alkyd paint spray RAL 1021 dissolvability/loss of gloss | 1/0 | 1/0 | 3/1 | film destroyed |
| Acrylic paint spray RAL 6010 dissolvability/loss of gloss | 1/0 | 1/0 | 3/1 | film destroyed |

*Evaluation 0–5; 0 = best score, 5 = worst score
**Deutsche Bundesbahn Test for Graffiti resistance
[1]Air Products & Chemicals, Inc.;
[2]Borchers GmbH, DE;
[3]Borchers GmbH, DE Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An aqueous crosslinkable binder dispersion comprising an hydroxy- and acid-functional copolymer which is produced from a monomer mixture consisting of
    (a1) ethylene glycol monoallyl ether,
    (a2) one or more acid-functional polymerizable monomers,
    (a3) one or more polymerizable monomers containing cyclic groups and
    (a4) one or more further polymerizable monomers selected from the group consisting of (meth)acrylic esters having $C_1$ to $C_{18}$ hydrocarbon radicals in the alcohol moiety, vinyl esters vinyl monomers containing alkylene oxide units, monomers containing epoxy groups, monomers containing alkoxysilyl groups, monomers containing urea groups, monomers containing urethane groups, monomers containing amide groups, monomers containing nitrile groups, difunctional and higher functional (meth)acrylate monomers and difunctional and higher functional vinyl monomers,
    (a5) optionally, one or more OH- and/or NH-functional polymerizable monomers, and
    (a6) optionally, one or more polyester oligomers, provided that (a3), (a4), (a5) and (a6) are different from each other and are different from (a1) and (a2).

2. The aqueous crosslinkable binder dispersion of claim 1, wherein said copolymer is produced from a monomer mixture consisting of
    (a1) from 5 to 60% by weight of ethylene glycol monoallyl ether,
    (a2) from 0.5 to 10% by weight of one or more acid-functional polymerizable monomers,
    (a3) from 5 to 60% by weight of one or more polymerizable monomers containing cyclic groups,
    (a4) from 5 to 60% by weight one or more further polymerizable monomers,
    (a5) from 0 to 40% by weight of one or more OH- and/or NH-functional polymerizable monomers, and
    (a6) optionally from 10 to 50% by weight of one or more polyester oligomers, the sum of the components of the mixture adding up to 100% by weight and provided that (a3), (a4), (a5) and (a6) are different from each other and are different from (a1) and (a2).

3. The aqueous crosslinkable binder dispersion of claim 1, wherein component (a6) is present.

4. The aqueous crosslinkable binder dispersion of claim 2, wherein component (a6) is present.

5. The aqueous crosslinkable binder dispersion of claim 4, wherein component (a6) is a polyester oligomer having an average molecular weight ($M_n$) of from 500 to 3000, an acid number of from 0 to 15 mg KOH/g and an OH number of from 50 to 300 and an unsaturated C=C double bond content of from 0.1 to 1.1% by weight.

6. The aqueous crosslinkable binder dispersion of claim 1, wherein the binder dispersion has an OH content of from 2 to 10% by weight, an average molecular weight $M_n$ of from 500 to 20 000 and an acid group content of 5 to 100 meq/100 g, at least some of which acid groups are in neutralized form.

7. The aqueous crosslinkable binder dispersion of claim 1, wherein the binder dispersion has a solvent content of from 0 to 12%.

8. A substrate coated with the aqueous binder dispersion of claim 1.

* * * * *